US009944523B2

(12) United States Patent
Muret et al.

(10) Patent No.: US 9,944,523 B2
(45) Date of Patent: Apr. 17, 2018

(54) HIGH STRENGTH, LOW SALT HYPOCHLORITE PRODUCTION

(71) Applicant: Chemetics Inc., Vancouver (CA)

(72) Inventors: Frédéric Pascal Olivier Muret, Coquitlam (CA); Ian Christopher Bailey, Vancouver (CA)

(73) Assignee: Chemetics Inc., Vancouver (CA)

( * ) Notice: Subject to any disclaimer, the term of this patent is extended or adjusted under 35 U.S.C. 154(b) by 31 days.

(21) Appl. No.: 14/638,826

(22) Filed: Mar. 4, 2015

(65) Prior Publication Data

US 2015/0251908 A1   Sep. 10, 2015

Related U.S. Application Data

(60) Provisional application No. 61/948,508, filed on Mar. 5, 2014.

(51) Int. Cl.
| | |
|---|---|
| C01B 11/06 | (2006.01) |
| C25B 1/16 | (2006.01) |
| C25B 15/08 | (2006.01) |
| C25B 1/34 | (2006.01) |

(52) U.S. Cl.
CPC .............. C01B 11/062 (2013.01); C25B 1/34 (2013.01); C25B 15/08 (2013.01)

(58) Field of Classification Search
CPC ................................ C01B 11/062; C25B 1/34
USPC ................................................ 423/472, 473
See application file for complete search history.

(56) References Cited

U.S. PATENT DOCUMENTS

| | | | |
|---|---|---|---|
| 1,261,572 A | 4/1918 | McElroy | |
| 1,632,483 A | 6/1927 | MacMullin | |
| 4,159,232 A * | 6/1979 | Bacon | C22B 15/0069 205/347 |
| 4,299,682 A * | 11/1981 | Oda | C25B 1/46 204/265 |
| 4,702,805 A | 10/1987 | Burkell et al. | |
| 4,780,303 A | 10/1988 | Dugua | |
| 4,795,535 A | 1/1989 | Bolduc et al. | |
| 5,154,805 A | 10/1992 | Wide et al. | |

(Continued)

FOREIGN PATENT DOCUMENTS

| | | |
|---|---|---|
| WO | 2006/017234 | 2/2006 |
| WO | 2008/082626 | 7/2008 |

*Primary Examiner* — Ngoc-Yen Nguyen
(74) *Attorney, Agent, or Firm* — Seed IP Law Group LLP

(57) ABSTRACT

High strength, low salt solutions of alkali hypochlorite (e.g. sodium hypochlorite) can advantageously be produced in a system comprising a subsystem in which alkali hydroxide solution and chlorine are reacted to produce alkali hypochlorite and salt solids in a crystallizer, while drawing a vacuum in the crystallizer. In a system comprising a chlor-alkali plant, the alkali hydroxide solution and chlorine can be directly obtained (i.e. without concentrating) from the electrolyzer in the plant. A net energy savings in the system can be achieved and water consumption in the chlor-alkali plant can be substantially decreased by returning chlorinated condensate from the crystallizer to the recycle line in the chlor-alkali plant. Salt can be efficiently recovered by redissolving the salt solids produced in depleted brine and returning it directly to the electrolyzer. As a result, high strength, low salt hypochlorite can be produced without the need to evaporate caustic.

6 Claims, 5 Drawing Sheets

(56) References Cited

U.S. PATENT DOCUMENTS

| | | | |
|---|---|---|---|
| 7,056,356 B2 * | 6/2006 | Allen | B01D 9/0022 23/295 R |
| 7,175,824 B2 | 2/2007 | Powell et al. | |
| 8,491,864 B2 | 7/2013 | Powell et al. | |
| 8,623,318 B2 | 1/2014 | Powell et al. | |
| 2005/0281731 A1 * | 12/2005 | Powell | B01F 3/0865 423/473 |

* cited by examiner

HIGH STRENGTH, LOW SALT HYPOCHLORITE PRODUCTION

TECHNICAL FIELD

The present invention pertains to processes and systems for producing high strength, low salt hypochlorite. In particular, it pertains to processes and systems that are integrated with chlor-alkali plants and obtain reactants therefrom.

BACKGROUND

Sodium hypochlorite is a commodity chemical product that is widely used for numerous industrial and individual purposes. It is generally prepared by reacting sodium hydroxide and chlorine and the product hypochlorite is provided in aqueous solutions of differing concentration. In many conventional hypochlorite production systems, a chlor-alkali plant is first used to produce the NaOH and chlorine reactants for subsequent production of hypochlorite. Sodium chloride is a co-product in the preparation and is thus present to some extent in the hypochlorite products. Lower concentration hypochlorite solutions are more easily prepared, but are less efficient to store and transport. Higher concentration hypochlorite solutions are preferred for storage and transport purposes, but are more difficult to prepare. Consequently, an effort continues to develop improved processes and systems to more easily and more efficiently produce high concentration or high strength hypochlorite solutions. Further, the hypochlorite decomposes slowly in the presence of sodium chloride and thus it is generally desirable to reduce the amount of sodium chloride co-product present in order to increase the shelf life of these solutions.

U.S. Pat. No. 4,780,303 is exemplary of developments in the field and discloses two stage processes for the continuous preparation of high concentration sodium hypochlorite. The processes comprise reacting in two stages pure chlorine or chlorine diluted with inert gases with a sodium hydroxide having a concentration of from about 20 to about 50 weight percent. The first stage of chloration of the sodium hydroxide is carried out in an absorption column in which the concentration of sodium hypochlorite and sodium hydroxide are respectively limited to 15% and 4.5% by weight. In the second stage, a crystallizer is continuously fed with the sodium hypochlorite solution from the absorption column, 48-50 weight percent sodium hydroxide, and the pure or diluted chlorine. At the outlet of this crystallizer, there is continually removed, generally by overflow, about a 25 weight percent sodium hypochlorite solution saturated with about 9.5 weight percent sodium chloride and containing from 0.3 to 0.8 weight percent sodium hydroxide in excess to avoid the formation of the chlorate, NaClO3. The sodium chloride formed in this second step is removed either discontinuously or continuously at the bottom of the crystallizer. The mean diameter of the sodium chloride particles is about 400 to 500 microns, thus permitting a very good solid-liquid separation and a very small mother liquor retention by the solid.

Further, WO2006/017234 discloses a two stage process and apparatus for producing hypochlorite (bleach) products of high strength and low salt. The high-strength, low salt bleach produced by the disclosed process and apparatus, when diluted to a lower strength comparable with typical domestic commercial bleaches has improved stability, and hence extended half-life when compared to such bleaches. The disclosed method is for the continuous manufacture of a high-strength, low-salt, aqueous sodium hypochlorite bleach from a lower strength aqueous sodium hypochlorite bleach from a first stage that has some sodium hydroxide and is essentially free of sodium chloride crystals. In the second stage, the method comprises continuously reacting in a tank 1) the lower strength aqueous sodium hypochlorite bleach that has some sodium hydroxide and is essentially free of salt crystals, 2) aqueous sodium hydroxide solution having a concentration by weight within a range from about 45% to about 51%, and 3) chlorine in gas and/or liquid phase that may or may not include inerts to create a solution having a) a precipitation zone where salt crystals are precipitating out of solution and falling downward to form a slurry, some of which is withdrawn, then cooled, and then re-introduced into the precipitation zone, and b) above the precipitation zone, a crystal-free mother liquor zone consisting essentially of crystal-free mother liquor containing a weight percentage of sodium hypochlorite greater than that of the lower strength aqueous sodium hypochlorite bleach being reacted.

Further still, WO2008/082626 discloses an improvement for simplifying the equipment and process that are the subject of the aforementioned WO2006/017234. A similar higher-strength, lower-salt bleach is produced (e.g. after removal of solids, a bleach having approximately 30% to approximately 35% by weight sodium hypochlorite and a NaCl/NaOCl ratio of about 0.21 to about 0.25 at 30% strength and about 0.10 to about 0.15 at 35% strength, with slight excess caustic). However here, the continuous process is conducted in a crystallizer tank without continuously drawing off mother liquor at the top of a calming zone. That allows the tank to not have a skirt baffle that otherwise would divide the portion of the tank above the bottom zone into a central inner zone surrounded by an outer calming zone.

Despite the numerous efforts in the field to date, there still remains a need however for ever greater efficiency with regards to the production of high strength, low salt alkali hypochlorites, and especially sodium hypochlorite.

SUMMARY

The present invention provides for improved processes and systems for producing high strength, low salt solutions of an alkali hypochlorite, and particularly solutions of sodium hypochlorite. The processes and associated systems employ a crystallizer in which alkali hydroxide solution and chlorine are reacted to produce a mixture comprising the alkali hypochlorite solution and solids of an alkali chloride. During the reacting, a vacuum is drawn in the crystallizer. The invention is suitable for use in a system comprising a chlor-alkali plant since alkali hydroxide solution and chlorine can be obtained directly from the electrolyzer in the plant and used to produce the alkali hypochlorite solutions. Several advantages can be realized with such an arrangement, including energy savings and more efficient use of the recovered salt.

Specifically, a process and system are provided for producing a high strength, low salt solution of an alkali hypochlorite in a system comprising a subsystem for reacting an alkali hydroxide solution and chlorine to produce the alkali hypochlorite. The process comprises providing the alkali hydroxide solution and chlorine to the subsystem, and reacting the alkali hydroxide solution and chlorine in a crystallizer to produce a mixture comprising the alkali hypochlorite solution and solids of an alkali chloride salt. In addition, the process comprises drawing a vacuum in the crystallizer during the reacting. By drawing a vacuum, water is removed and a higher strength product is produced. The alkali hypochlorite solution is removed from the crystallizer, thereby producing the high strength, low salt solution, and the alkali chloride salt solids are separated from the mixture.

In one embodiment, the alkali is sodium and the alkali hypochlorite produced is sodium hypochlorite. Using the method of the invention, the high strength, low salt solution produced can have a concentration of sodium hypochlorite that is greater than or equal to 30% and a concentration of sodium chloride that is less than or equal to 7%.

In another embodiment, the system comprises a chlor-alkali plant which includes an electrolyzer and an alkali brine recycle line. The recycle line directs a stream of supply brine to an electrolyzer inlet and directs a stream of depleted brine from an electrolyzer outlet. The subsystem can then react alkali hydroxide solution (e.g. 32% NaOH) and chlorine obtained directly from the electrolyzer to produce the alkali hypochlorite in the crystallizer. Here, the high strength, low salt solution can essentially be produced in a single stage. And greater than 99.5% of the total produced high strength, low salt solution can essentially be produced in such a single stage.

In such an embodiment, the separated alkali chloride salt solids can be efficiently recovered and reused in the system by dissolving them in a portion of the depleted brine stream from the electrolyzer outlet to create a recovered salt brine stream, and by then combining the recovered salt brine stream directly with the supply brine stream being directed to the electrolyzer inlet. With such an approach, existing hypochlorite production systems can, for instance, be expanded without increasing the capabilities for primary and secondary treatment in the component chlor-alkali plant.

In this embodiment, sodium hydroxide and chlorine products from the electrolyzer in the system do not need to be concentrated nor compressed prior to using as reactants in the production of hypochlorite solution and precipitated salt. Thus, the system can be absent both a caustic evaporator for concentrating the alkali hydroxide solution obtained from the electrolyzer, and a chlorine compressor for compressing the chlorine obtained from the electrolyzer. And because the energy requirement for drawing the required vacuum in the crystallizer is relatively low, significant energy savings may be achieved in the overall system. Further, water and salt consumption in the chlor-alkali plant can be substantially decreased by returning chlorinated condensate from the crystallizer to the recycle line in the chlor-alkali plant.

DETAILED DESCRIPTION

Unless the context requires otherwise, throughout this specification and claims, the words "comprise", "comprising" and the like are to be construed in an open, inclusive sense. The words "a", "an", and the like are to be considered as meaning at least one and not limited to just one. Further, in a numerical context, the word "about" is to be construed as meaning plus or minus 10%.

Herein, a high strength sodium hypochlorite solution is defined as an aqueous solution whose [NaOCl] is greater than 25% (and is consistent with the aforementioned WO2006/017234).

Herein, a low salt sodium hypochlorite solution is defined as an aqueous solution whose [NaCl] is less than 9.5% (and is also consistent with the aforementioned WO2006/017234).

System for Production of Low Strength Sodium Hypochlorite Solution

Figure 1:
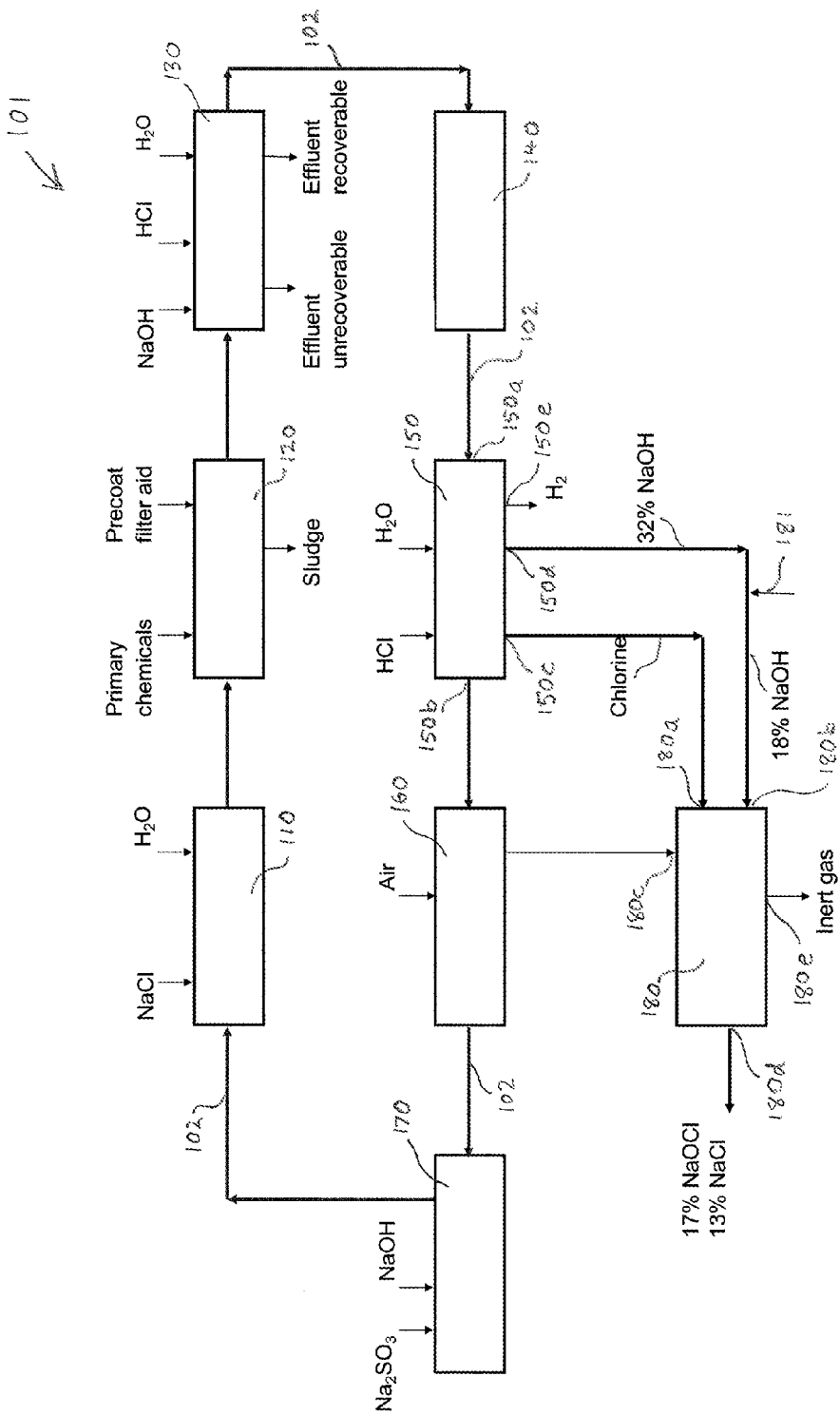
FIG. 1 shows a simplified schematic of a prior art system for producing low strength hypochlorite. The system comprises an industrial chlor-alkali plant and caustic and chlorine reactants are obtained therefrom.

A simplified schematic of a prior art system for producing low strength hypochlorite is shown in FIG. 1. The system includes an industrial chlor-alkali plant which produces caustic NaOH and chlorine $Cl_2$ that are in turn used as reactants to prepare the sodium hypochlorite product.

The chlor-alkali plant in system 101 comprises electrolyzer 150 and alkali brine recycle line 102 which directs an appropriately treated stream of supply brine to electrolyzer inlet 150a and recycles a stream of depleted brine from electrolyzer outlet 150b. The alkali brine here is an aqueous solution of NaCl and it undergoes electrolysis in electrolyzer 150 to produce primary products $Cl_2$ gas (at the anode or anodes) and NaOH and hydrogen gas (at the cathode or cathodes). The product $Cl_2$, NaOH, and $H_2$ are removed at outlets 150c, 150d, and 150e respectively. As shown in FIG. 1, HCl and water are also provided to electrolyzer 150 for purposes of dechlorination and NaOH concentration control.

The depleted brine stream from electrolyzer outlet 150b then undergoes two stages of dechlorination. First, the depleted brine stream is directed to primary dechlorination unit 160 in which residual chlorine is stripped, for instance, into air which is directed through unit 160. The amount of chlorine in the chlorine/air mixture is typically quite low (less than 0.5%). Then, the depleted brine stream is directed to secondary dechlorination unit 170 in which sodium sulfite and sodium hydroxide are reacted with any remaining chlorine to produce sodium sulfate, sodium chloride, and water.

The concentration of NaCl in the brine stream is then brought back up to the desired level. This is accomplished by addition of NaCl and water to the dechlorinated depleted brine stream in saturator unit 110. The reconcentrated brine stream then undergoes two stages of treatment to remove impurities which may be present in the added salt and added water. A first treatment involves reacting with a combination of primary treatment chemicals in primary treatment unit 120 to produce precipitates which are filtered out with the addition of precoat filter aid. The brine stream is then directed to secondary treatment unit 130 where further purification takes place. NaOH, HCl and water are added for regeneration purposes producing two effluents; one which can be recovered and another one (unrecoverable) for disposal. The now treated and purified brine stream is directed to storage and conditioning unit 140 ready for electrolysis in electrolyzer 150.

The chlor-alkali plant in system 101 also comprises chlorine scrubbing system 180 which is used to "scrub" chlorine from the low concentration chlorine and air mixture coming from primary dechlorination unit 160. This mixture is provided to chlorine scrubbing system 180 at inlet 180c. The by-products of such "scrubbing" are a modest amount of low concentration sodium hypochlorite solution and inert gas which are provided from outlets 180d and 180e respectively. However, chlorine scrubbing subsystem 180 can essentially be used as a subsystem for producing a significant amount of sodium hypochlorite if additional $Cl_2$ and NaOH reactants are provided. This is the case in FIG. 1, where the $Cl_2$ and NaOH produced by electrolyzer 150 are provided to subsystem 180 at inlets 180a and 180b respectively. As shown, the gaseous $Cl_2$ product is provided directly to subsystem 180, while the NaOH solution product is first diluted down using demineralized water (introduced at 181) from a concentration of about 32% to a concentration of about 18% and then provided to subsystem 180. A sodium hypochlorite solution of modest strength (up to approximately 17%), and comprising about 13% sodium chloride, is now obtained at outlet 180d. Under these process conditions, NaCl does not precipitate during hypochlorite production and thus means for removing precipitated salt are obviously not required. Further, no arrangement is provided to recover and reuse the salt produced. (It is however worth noting that the feed salt added to saturator unit 110 represents a significant operating cost of the system. About 50% of the feed salt ends up in the hypochlorite product.)

In commercial systems, additional processes and associated equipment are frequently employed. For instance, sodium sulfate impurity typically is present in the process salt provided and can undesirably increase in concentration in the recycling brine stream unless it is continually removed. Although not shown in FIG. 1, a nanofiltration based, sulfate removal subsystem can desirably be provided for that purpose as a branch loop in the recycling brine stream between secondary dechlorination unit 170 and saturator unit 110. Also for instance, small amounts of sodium chlorate are produced in electrolyzer 150. Such chlorate can desirably be removed using a chlorate destruction subsystem that is provided as a branch loop in the recycling brine stream between electrolyzer 150 and primary dechlorination unit 160. (Note that many other components and/or subsystems, such as pumps, tanks, heat exchangers, control subsystems, are typically employed in systems like that shown in FIG. 1, but these have been omitted for simplicity.)

System for Two Stage Production of High Strength Sodium Hypochlorite Solution

Figure 2A:
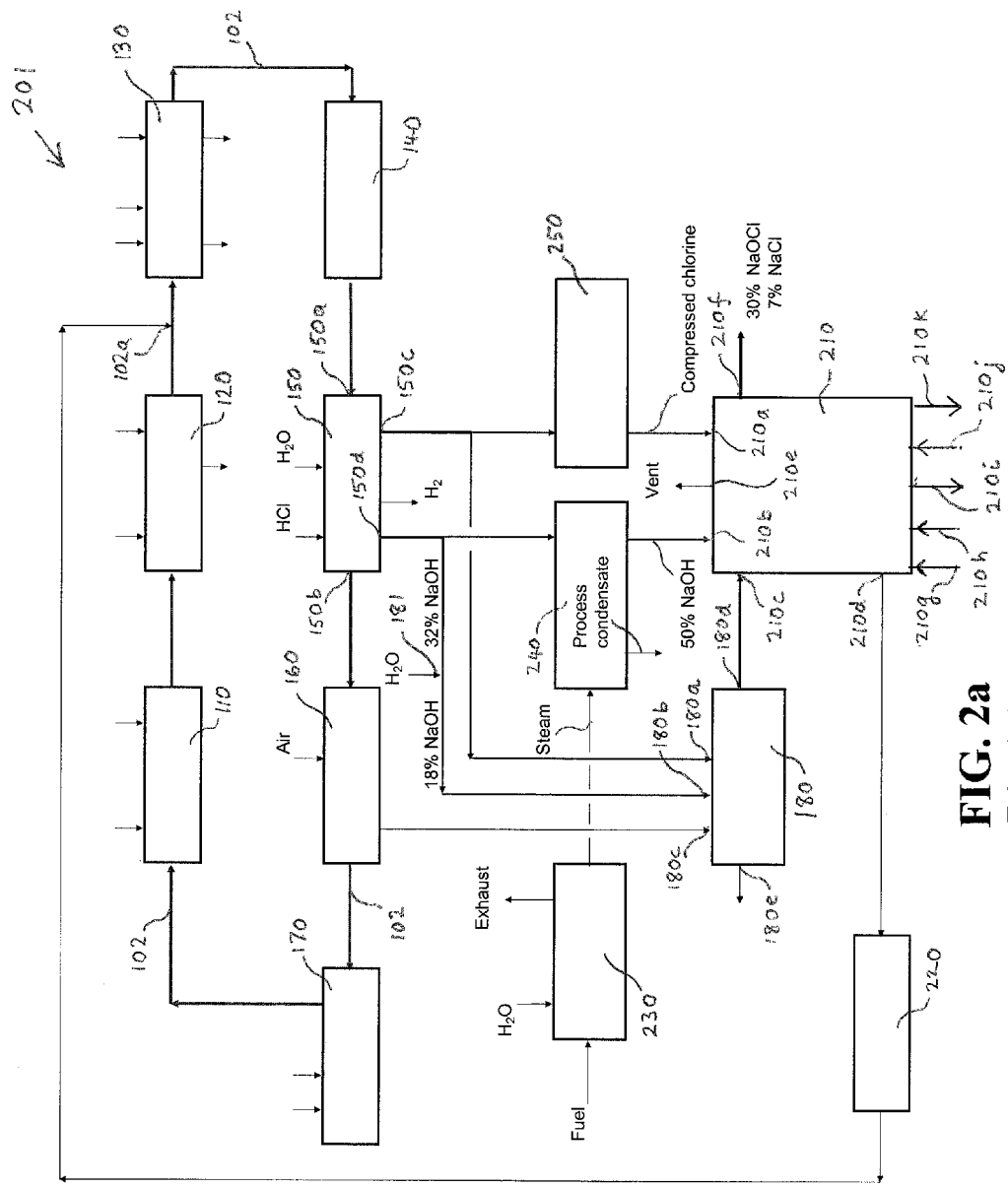
FIG. 2a shows a simplified schematic of a possible system for making high strength, low salt hypochlorite based on a two stage hypochlorite production process of the prior art.
Figure 2B:
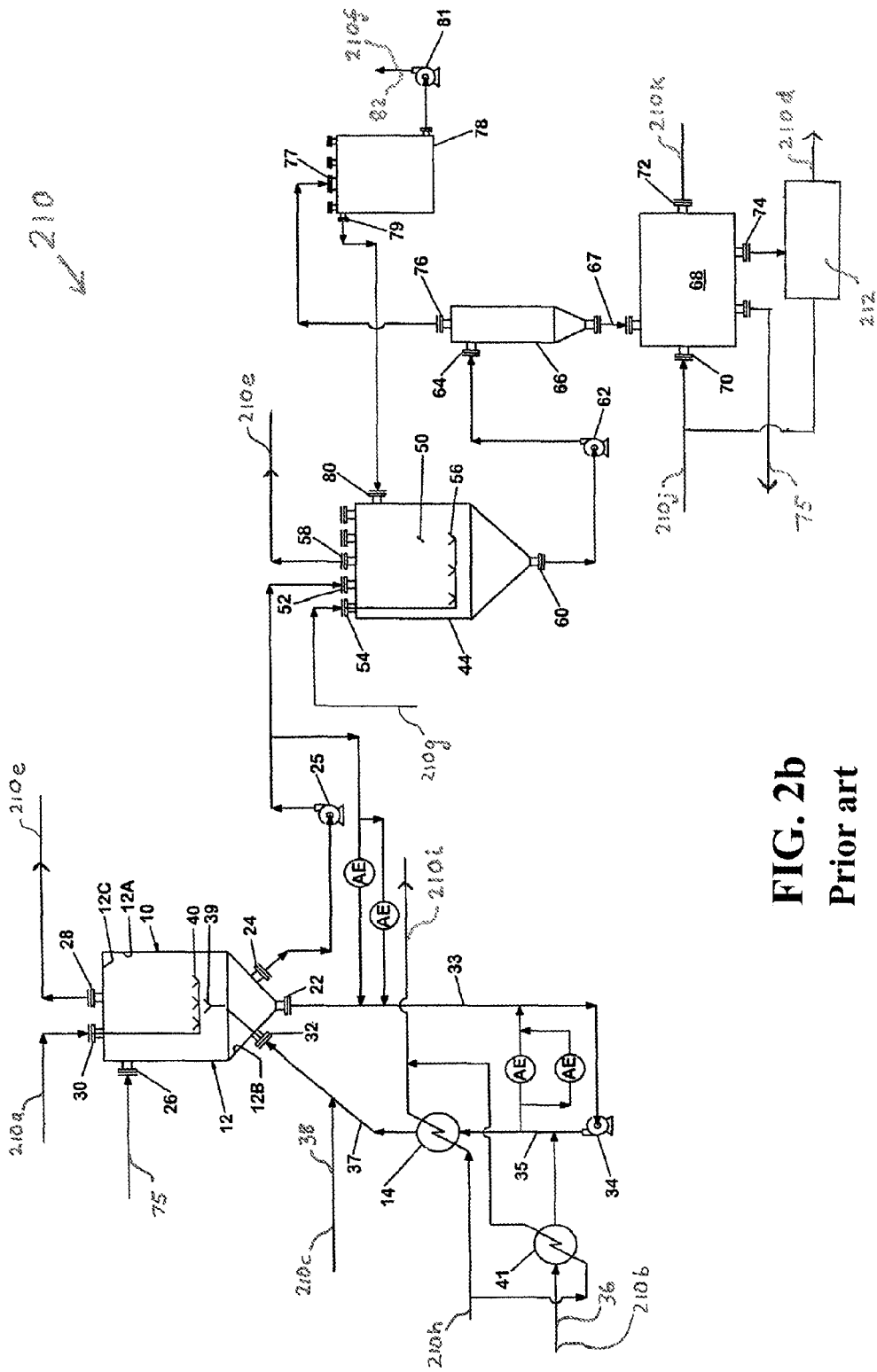
FIG. 2b shows a simplified schematic of the subsystem in FIG. 2a for the second stage production of hypochlorite and associated subsequent processing.

FIGS. 2a and 2b illustrate a possible system for making high strength, low salt hypochlorite based on a two stage hypochlorite production process of the prior art. FIG. 2a shows a simplified schematic of such a system, and FIG. 2b shows a simplified schematic of the subsystem in FIG. 2a for the second stage production of hypochlorite and associated subsequent processing.

Hypochlorite production system 201 in FIG. 2a comprises a chlor-alkali plant similar to that shown in FIG. 1, and components common thereto have been identified with like numerals. (Some labels common to both have been omitted however to reduce clutter.) To produce high strength, low salt NaOCl, system 201 incorporates a hypochlorite reactor subsystem 210 of the aforementioned WO2008/082626. However, the process of WO2008/082626 requires the NaOH reactant to be provided at a high concentration of approximately 50%. This is a significantly higher concentration than that of the ~32% NaOH solution produced by electrolyzer 150. Thus, system 201 requires means for concentrating this caustic solution. In FIG. 2a, this is achieved using steam-driven caustic evaporator 240. NaOH solution is obtained from electrolyzer outlet 150d, is directed to caustic evaporator 240, and then the ~50% NaOH solution is delivered to hypochlorite reactor subsystem 210 at inlet 210b. The required steam for caustic evaporator 240 is provided by boiler 230 using a closed loop system. Boiler 230 requires inputs of fuel and demineralized water and outputs steam and exhaust gas as shown in FIG. 2a. An output of caustic evaporator 240 is process condensate which can be used as a supply of water to other locations in the system, e.g. the water supply added to saturator unit 110 and/or added at location 181 to dilute down the NaOH product from electrolyzer 150 (such supply lines are not shown in FIG. 2a).

The process of WO2008/082626 also requires the chlorine reactant to be provided at a higher pressure than is produced from electrolyzer 150. (As later shown in FIG. 2b, chlorine reactant is provided under pressure to crystallizer 10 in which the reactions take place and solid salt precipitate is generated.) In FIG. 2a, this is achieved using chlorine compressor 250 (in which along with compression, the processing can also involve cooling, drying, and liquefaction). Chlorine is obtained from electrolyzer outlet 150c, is directed to chlorine compressor 250, and then the compressed chlorine is delivered to hypochlorite reactor subsystem 210 at inlet 210a.

As in FIG. 1, chlorine scrubbing subsystem 180 also produces sodium hypochlorite and salt solution at similar concentrations to that produced in FIG. 1. In system 201 of FIG. 2a, subsystem 180 serves as the first stage of production of hypochlorite. Hypochlorite reactor subsystem 210 serves as the second stage of production of hypochlorite. Hypochlorite product (at [NaOCl] of ~17%) from subsystem 180 is obtained at outlet 180d and is provided to inlet 210c of subsystem 210. Hypochlorite reactor subsystem 210 produces approximately three times the hypochlorite that subsystem 180 produces.

High strength ([NaOCl] of ~30%), low salt ([NaCl] of ~7%) hypochlorite solution product is obtained from hypochlorite reactor subsystem 210 at outlet 210f. Recovered NaCl salt solids are redissolved in hypochlorite reactor subsystem 210 and a solution of this recovered salt is obtained at outlet 210d. The recovered salt solution is dechlorinated in dechlorination unit 220 and is then directed back into recycle line 102 for secondary treatment at point 102a (between primary treatment unit 120 and secondary treatment unit 130).

As shown in more detail in FIG. 2b, hypochlorite reactor subsystem 210 also has several other inlets and outlets for various functions. Included are vent 210e, air inlet 210g (which provides air to pre-thickening tank 44), cooling water inlet 210h and cooling water outlet 210i (which provide cooling water to the heat exchangers therein), and wash water inlet 210j and wash water outlet 210k (which provide wash water to centrifuge 68 therein).

FIG. 2b shows a simplified schematic of hypochlorite reactor subsystem 210 in FIG. 2a. FIG. 2b is essentially a combination of FIGS. 1 and 2 from the aforementioned WO2008/082626, and the components, relative configuration, and identifying numerals remain the same. In addition though, FIG. 2b also identifies the various inlets and outlets with the numbering used for the various inlets and outlets of hypochlorite reactor subsystem 210 in FIG. 2a. And in addition here, subsystem 210 also comprises salt dissolver unit 212 in which recovered NaCl salt solids from centrifuge 68 are redissolved and then output as recovered salt solution at outlet 210d. As solvent for this purpose, demineralized water (e.g. obtained from the same supply at wash water inlet 210j) is also supplied to salt dissolver unit 212.

Hypochlorite reactor subsystem 210 provides for the second stage production of hypochlorite and associated subsequent processing. The function and interaction of all the components therein are described in detail in WO2008/082626. Main components in subsystem 210 are crystallizer 40 (in which the hypochlorite production reaction takes place and in which NaCl salt crystals of appropriate size are formed) and the recycling apparatus for the solution therein. Importantly, crystallizer 40 is designed to function as a surface cooled crystallizer. Further, the recycling rate, locations of the recycle inlet and outlet, and temperature difference of the recycling solution between the inlet and outlet are all important aspects of the process and require careful design and/or control.

Hypochlorite production system 201 produces quality high strength, low salt hypochlorite product but requires significant energy input to condition the NaOH and chlorine reactants from the electrolyzer for the second stage of the hypochlorite production. By-product crystallized salt can be recovered to some extent and returned to the recycle line of the chlor-alkali plant for re-use.

Figure 3A:
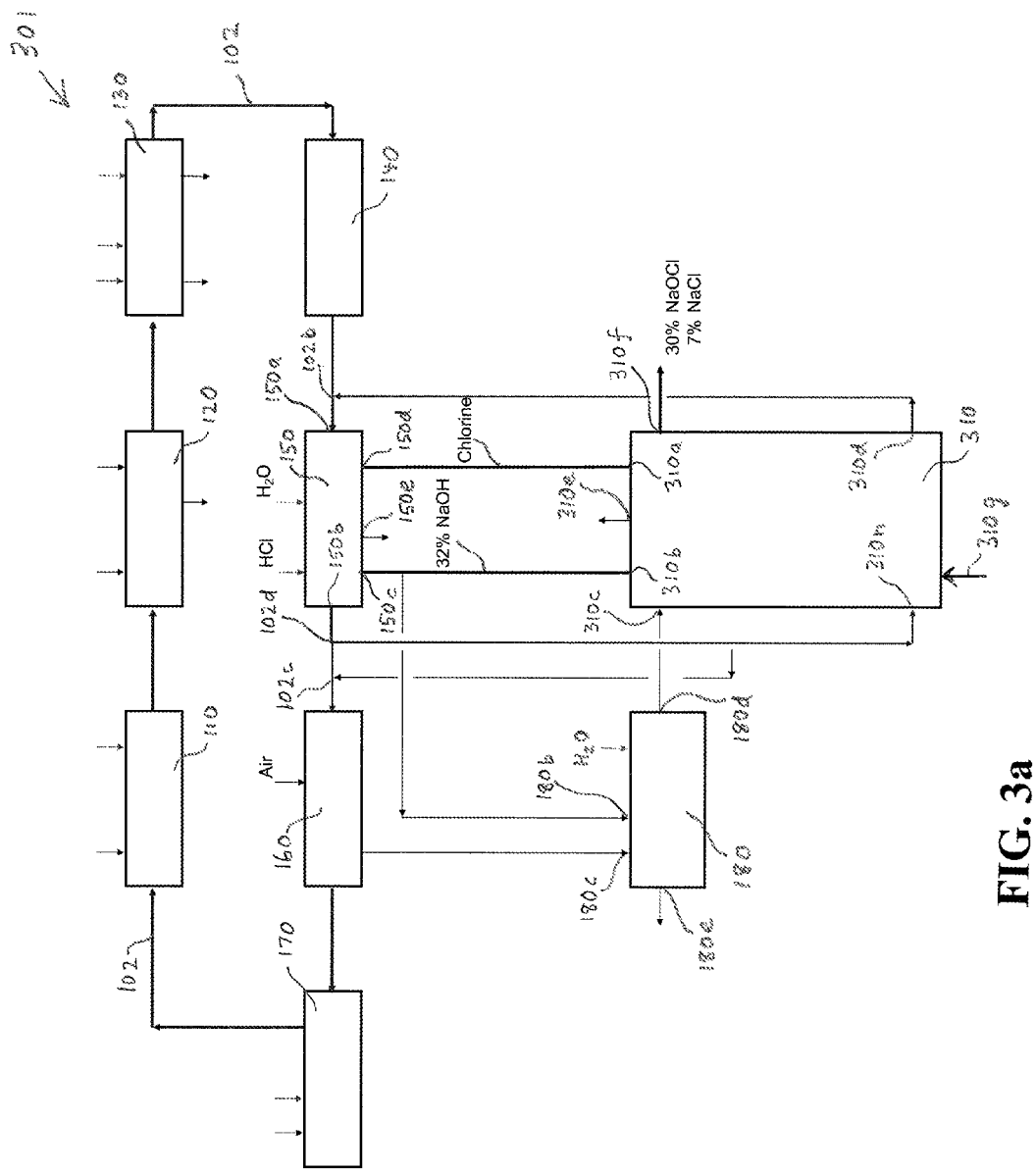
FIG. 3a shows a simplified schematic of a system of the invention with improved efficiency for making high strength, low salt hypochlorite based on essentially a single stage hypochlorite production process.
Figure 3B:
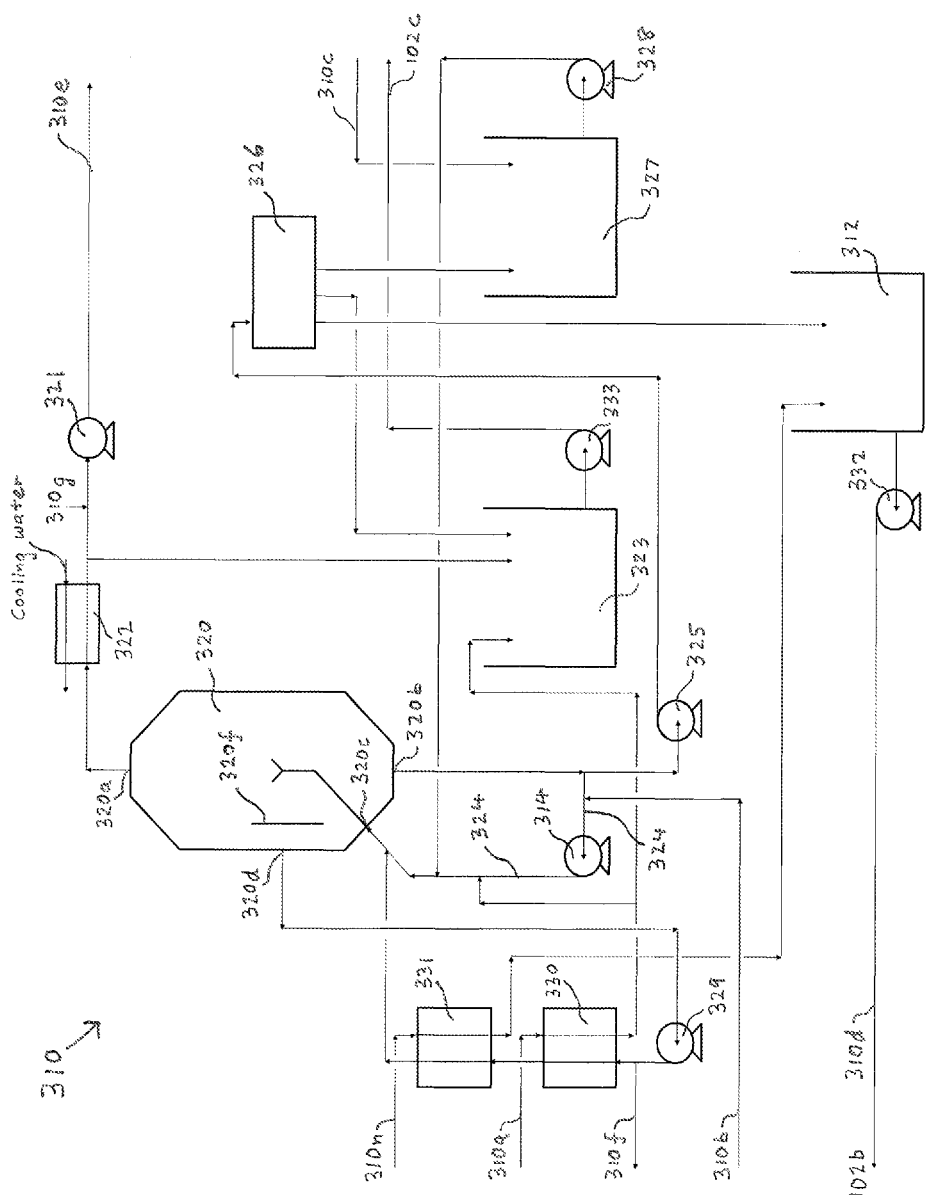
FIG. 3b shows a simplified schematic of the subsystem in FIG. 3a for essentially all the production of hypochlorite and associated subsequent processing.

Inventive System for Single Stage Production of High Strength Sodium Hypochlorite Solution FIGS. 3a and 3b illustrate one possible embodiment of a system of the invention with improved efficiency for making high strength, low salt hypochlorite based on essentially a single stage hypochlorite production process. Further, the system is an exemplary one comprising a chlor-alkali plant. FIG. 3a shows a simplified schematic of the overall system and FIG. 3b shows a simplified schematic of the subsystem in FIG. 3a for essentially all the production of hypochlorite and associated subsequent processing.

Hypochlorite production system 301 in FIG. 3a comprises a chlor-alkali plant similar to that shown in FIG. 1, and components common thereto have been identified with like numerals. (Again, some labels common to both have been omitted however to reduce clutter.) And to produce high strength, low salt sodium hypochlorite, system 301 incorporates a hypochlorite reactor subsystem 310.

In FIG. 3a, the $Cl_2$ and NaOH produced in electrolyzer 150 are provided directly to hypochlorite reactor subsystem 310 at inlets 310a and 310b respectively. As shown here and unlike system 201 above, neither of these reactants needs to be concentrated or compressed beforehand. In crystallizer 320 (FIG. 3b), the $Cl_2$ and NaOH are reacted to produce a mixture comprising NaOCl solution and NaCl solids. The product NaOCl solution is removed from the crystallizer at outlet 310f and the NaCl solids are separated from the mixture for re-use. The product hypochlorite solution is again of high strength ([NaOCl] of ~30%) and low in salt ([NaCl] of ~7%).

In FIG. 3a, chlorine scrubbing subsystem 180 is not used for hypochlorite production per se and is not provided with chlorine nor a substantial amount of NaOH from electrolyzer 150. Instead, it is used just to scrub chlorine in a conventional manner from the component chlor-alkali plant (i.e. scrubs chlorine removed from recycle line 102 by primary dechlorination unit 160). However, to accomplish this, a modest amount of NaOH solution is used in chlorine scrubbing subsystem 180 and is obtained directly from electrolyzer 150 and provided at inlet 180b. The scrubbing produces a very low concentration hypochlorite solution which is output from outlet 180d and directed to inlet 310c for use in hypochlorite reactor subsystem 310. Subsystem 180 does therefore produce a very modest amount of hypochlorite, but it is trivial compared to that produced in hypochlorite reactor subsystem 310 (which produces more than 99.5% of the total hypochlorite produced in system 301). And thus, essentially all the hypochlorite is produced in a single stage in subsystem 310.

In system 301, a portion of the depleted brine stream from electrolyzer 150 is diverted at point 102d from recycle line 102 and is directed to inlet 310n of subsystem 310. As shown in more detail in FIG. 3b, this portion of the depleted brine stream is used for heat exchange purposes and also for dissolving and recovering crystallized salt solids. The dissolving takes place in salt dissolver unit 312 and the recovered salt solution is output from outlet 310d. The recovered salt solution is then recycled back to directly to electrolyzer 150 for re-use by directing it back to recycle line 102 at point 102b. Note that the volume of the recovered salt solution stream from outlet 310d in FIG. 3a is much greater than the volume of recovered salt solution from outlet 210d in FIG. 2a. (In other embodiments, the recovered salt solution can instead be directed back to recycle line 102 at other points in the system. For instance, if secondary treatment is still considered desirable, the recovered salt solution from outlet 310d can be merged with the brine stream entering secondary treatment unit 130. In another example, the recovered salt solution from outlet 310d can be merged with the brine stream entering storage and conditioning unit 140. Further, if dechlorination is desirable, the recovered salt solution from outlet 310d can initially be directed through another provided dechlorination unit [not shown]).

As in FIG. 2a, hypochlorite reactor subsystem 310 also has other inlets and outlets for various functions. Thus, also shown in FIG. 3a are vent 310e and air inlet 310g.

FIG. 3b shows a simplified schematic of subsystem 310 in which essentially all the hypochlorite is produced in crystallizer 320. Like crystallizer 40 above, crystallizer 320 also serves to crystallize and generate salt solids from the reactant mixture within. Here however, crystallizer 320 functions as an evaporative crystallizer by drawing a vacuum on the mixture within at outlet 320a. Vacuum can be provided as shown by vacuum pump 321 with the exhaust vented at subsystem outlet 310e. However, other apparatus familiar to those in the art may be used instead to create the required vacuum. Crystallizer condenser 322 is used to condense water vapour removed from crystallizer 320. The condensed water is recovered and directed to chlorinated condensate tank 323. Because the mixture in crystallizer 320 is under vacuum and is boiling, a greater headroom is required than in crystallizer 40. This provides strong agitation and avoids high oversaturation and promotes crystal growth instead of germination.

The recycle aspects and temperatures employed in crystallizer 320 are similar to those already used in the art. Chlorine and NaOH reactants are provided directly from electrolyzer 150 to subsystem inlets 310a and 310b respectively where they merge with slurry recycling from crystallizer 320 in recycle line 324. Slurry is pumped by recycle pump 314 and recycles in a large loop from outlet 320b and returns at inlet 320c.

In crystallizer 320, NaOCl solution and solid NaCl crystals are formed and a slurry is created. While a portion of that slurry is recycled in recycle line 324, another portion is pumped via slurry pump 325 to centrifuge 326 where the salt solids are centrifuged out. Wash solution for the centrifuge operation can be obtained from chlorinated condensate tank 323 (not shown in FIG. 3b). The recovered salt solids are then directed to salt dissolver unit 312 and the centrate solution is directed to centrate tank 327. From there, the centrate solution can also be pumped via centrate pump 328 to be merged with recycling slurry in recycle line 324.

A primarily liquid fraction is obtained near quieting baffle 320f in crystallizer 320 and is removed at outlet 320d. The primarily liquid fraction is pumped through fines destruction pump 329. A portion of the liquid fraction is then withdrawn as high strength, low salt hypochlorite product at outlet 310f. The remaining portion of the liquid fraction is passed through two heat exchangers in series. The first of these is chlorine cooler 330 where heat is exchanged with chlorine coming from electrolyzer 150. The second of these is depleted brine heat exchanger 331 which exchanges heat with depleted brine obtained from point 102d in recycle line 102. From the heat exchange, this portion of the liquid fraction is heated and the salt fines are redissolved. The heat exchanged portion of the liquid fraction is then merged with the recycling slurry in recycle line 324.

Heat exchanged depleted brine from heat exchanger 331 is then provided to salt dissolver unit 312 and serves as solvent for the recovered salt from centrifuge 326. The recovered salt solution is then pumped via brine pump 332 to merge with brine in recycle line 102 at point 102b and thus for re-use in electrolyzer 150.

As mentioned above chlorinated condensate can be used as wash water in centrifuge 326. Also, the chlorinated condensate may be employed as make up water elsewhere in the system for concentration adjustment of hypochlorite streams. Advantageously however, it can be returned as make up water to the main brine stream in recycle line 102 of the component chlor-alkali plant to displace otherwise required make up water supplied to saturator unit 110. To do this, chlorinated condensate pump 333 pumps chlorinated condensate from tank 323 to point 102c in recycle line 102. By comparison with the process shown in FIG. 1, it is estimated that by eliminating the addition of the water required for the first stage production of hypochlorite and by using this chlorinated condensate as make up water in recycle line 201, an approximate 60% decrease in consumption of demineralized water might be achieved in the system.

The exemplary inventive system above provides several advantages over the aforementioned two stage system for producing high strength sodium hypochlorite solution and the single stage system for producing low strength sodium hypochlorite solution.

Because the NaOH solution and chlorine reactants for the hypochlorite production can be used directly as obtained from electrolyzes 150, neither caustic evaporator 240 nor chlorine compressor 250 in hypochlorite reactor subsystem 210 are required. Consequently, the energy required to operate these devices is not required either. A modest amount of energy is required to operate the additional vacuum pump 321. However, this is substantially less than the energy required for caustic concentration or chlorine compression. Thus, there is substantial energy savings associated with use of hypochlorite reactor subsystem 310. (The energy input required to continuously evaporate water in crystallizer 320 is essentially provided via chlorine cooler 330 and heat exchanger 331. This energy is available already and is obtained from elsewhere in the system.)

Further, the arrangement for the recovered salt solution in the inventive embodiment of FIG. 3a is a substantial improvement over that in the embodiment of FIG. 2a. In both cases, recovered salt is advantageously returned to recycle line 102 of the component chlor-alkali plant. In FIG. 2a, the recycling brine stream is concentrated by introducing recovered salt solution from hypochlorite reactor subsystem 210 at 102a. In a practical embodiment, this allows for a reduction in the flow of brine through primary treatment unit 120 of an estimated 18%. However, the flow of brine through secondary treatment unit 130 is not reduced. On the other hand, in FIG. 3a, the recycling brine stream is concentrated by introducing recovered salt solution from hypochlorite reactor subsystem 310 at 102b. In a practical embodiment, this allows for a reduction in the flow of brine through both primary treatment unit 120 and secondary treatment unit 130 of an estimated 40% or more. In both cases, a reduction in the amount of chlor-alkali plant input chemicals can be realized (including supplied NaCl to saturator unit 110, primary chemicals to primary treatment unit 120, caustic and acid to secondary treatment unit 130). However, the reduction is much more substantial in the case of the inventive embodiment of FIG. 3a.

Alternatively, an existing low strength hypochlorite production system (like system 101 in FIG. 1) may be retrofitted to produce high strength hypochlorite solution according to the embodiments shown in FIG. 2a or 3a. In the embodiment of FIG. 2a, by using recovered salt solution from hypochlorite reactor subsystem 210 in recycle line 102, a greater amount of high strength hypochlorite solution can be obtained by scaling up certain components in the component chlor-alkali plant (e.g. electrolyzer 150, storage and conditioning unit 140, secondary treatment unit 130) without having to scale up primary treatment unit 120 or having to increase the supply of NaCl salt to saturator unit 110. However, a substantially even greater amount of high strength hypochlorite solution can be obtained using the embodiment of FIG. 3a while scaling up fewer components in the component chlor-alkali plant (i.e. storage and conditioning unit 140 and secondary treatment unit 130 need not be scaled up).

Another advantage of hypochlorite production system 301 in FIG. 3a is with regards to reduced consumption of water (e.g. demineralized water supply). A water savings is possible because the amount of chlorinated condensate in chlorinated condensate tank 323 is substantial and can be used for various purposes throughout the system. For instance, it can be used as wash water in crystallizer 320, as make up water at certain locations in the system, and significantly as a source of water to dissolve recovered salt in salt dissolver unit 312 for reuse in the component chlor-alkali plant. As mentioned above, compared to the embodiment of FIG. 1, the recovery of chlorinated condensate as make up water in recycle line 102 along with eliminating the need for additional water at location 181 in the first stage of hypochlorite production step leads to an estimated 60% decrease in the consumption of demineralized water in the overall system.

The hypochlorite reactor subsystem of the invention may be used in construction of new hypochlorite production systems employing a chlor-alkali plant. The associated brine system can be made smaller. And the reduced salt consumption associated therewith allows for greater options with regards to sourcing salt supply. For instance, a more expensive but higher quality salt supply may be considered if the cost is offset by a reduction or even elimination in primary and secondary treatment of the brine stream. Further, the hypochlorite reactor subsystem of the invention may be used in a retrofit situation of an existing hypochlorite production system employing a chlor-alkali plant. For instance, an existing system like that shown in FIG. 1 may be retrofit to produce improved high strength, low salt hypochlorite solution. An approximate 40% reduction in feedstock NaCl consumption may be expected for improved economics. Further still, consideration may even be given to retrofitting a system like that shown in FIG. 2a. For instance, a hypochlorite reactor subsystem 310 like that shown in FIG. 3b may be substituted for subsystem 210. And boiler 230, caustic evaporator 240, and chlorine compressor 250 may no longer be used. This may be worth considering if the various operating benefits of the invention outweigh the capital cost of such a retrofit. Even further, the invention may be used to modify an existing chlor-alkali plant to additionally produce hypochlorite product. Because the present invention is compatible with the grade of caustic NaOH produced by diaphragm type electrolyzers, diaphragm type chlor-alkali plants may be considered for such modification. In addition, if the existing chlor-alkali plant was set up to use feed salt of poor quality, it may be economically more advantageous to sell the high quality salt recovered in the hypochlorite reactor subsystem than to re-use it in the chlor-alkali plant.

And while the preceding description is mainly directed towards the production of sodium hypochlorite in a system comprising a chlor-alkali plant, other alternative uses and embodiments of the invention may be contemplated. For instance, while not as common perhaps, the process and systems could alternatively be used to produce other alkali hypochlorites.

Further, the disclosed improved subsystem for producing hypochlorite may be used in situations where the alkali hydroxide solution and chlorine reactants are not obtained from, or directly from, an electrolyzer in a chlor-alkali plant (e.g. in discrete blender operations). In this case, the recovered salt can be further processed to allow for sale of the salt.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since further modifications may be made by those skilled in the art without departing from the spirit and scope of the present disclosure, particularly in light of the foregoing teachings. Such modifications are to be considered within the purview and scope of the claims appended hereto.

The invention claimed is:

1. A process for producing a high strength, low salt solution of an alkali hypochlorite in a system comprising a subsystem for reacting an alkali hydroxide solution and chlorine to produce the alkali hypochlorite, the process comprising:
   providing the alkali hydroxide solution and chlorine to the subsystem;
   reacting the obtained alkali hydroxide solution and chlorine in a crystallizer to produce a mixture comprising the alkali hypochlorite solution and solids of an alkali chloride salt;
   drawing a vacuum in the crystallizer during the reacting to remove water;
   removing the alkali hypochlorite solution and the alkali chloride salt solids from the crystallizer; and
   separating the alkali chloride salt solids from the alkali hypochlorite solution, thereby yielding the high strength, low salt solution; and wherein greater than 99.5% of the total produced high strength, low salt solution is produced in a single stage.

2. The process of claim 1 wherein the alkali is sodium and the alkali hypochlorite is sodium hypochlorite.

3. The process of claim 1 wherein the system comprises a chlor-alkali plant comprising an electrolyzer and an alkali brine recycle line, the recycle line directs a stream of supply brine to an electrolyzer inlet and a stream of depleted brine from an electrolyzer outlet, and the subsystem is for reacting an alkali hydroxide solution and chlorine obtained from the electrolyzer to produce the alkali hypochlorite, the process comprising:
   providing the alkali hydroxide solution and chlorine obtained from the electrolyzer directly to the subsystem; and
   reacting the directly obtained alkali hydroxide solution and chlorine in the crystallizer to produce the mixture comprising the alkali hypochlorite solution and solids of an alkali chloride salt.

4. The process of claim 3 wherein the concentration of the directly provided alkali hydroxide solution obtained from the electrolyzer is about 32%.

5. The process of claim 3 comprising:
   dissolving the separated alkali chloride salt solids in a portion of the depleted brine stream from the electrolyzer outlet to create a recovered salt brine stream; and
   combining the recovered salt brine stream directly with the supply brine stream being directed to the electrolyzer inlet.

6. The process of claim 2 wherein the concentration of sodium hypochlorite is greater than or equal to 30% and the concentration of sodium chloride is less than or equal to 7% in the produced high strength, low salt solution.

* * * * *